UNITED STATES PATENT OFFICE.

OTTO SCHMIDT AND FRITZ GÜNTHER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCTION OF WATER-SOLUBLE CONDENSATION PRODUCTS OF THE NAPHTHALENE SERIES.

1,278,229.  Specification of Letters Patent.  Patented Sept. 10, 1918.

No Drawing.  Application filed January 29, 1917.  Serial No. 145,274.

*To all whom it may concern:*

Be it known that we, OTTO SCHMIDT and FRITZ GÜNTHER, citizens of the German Empire, residing at Ludwigshafen-on-the-Rhine, Germany, have invented new and useful Improvements in the Production of Water-Soluble Condensation Products of the Naphthalene Series, of which the following is a specification.

As is known, water-soluble condensation products can be produced by reacting on naphthalene sulfonic acids with formaldehyde and separating from difficultly soluble secondary products which may be formed. Now we have discovered, that water-soluble products are equally formed, when formaldehyde is caused to react with a naphthalene sulfonic acid in the presence of an insoluble naphthalene hydrocarbon, under which term we comprise naphthalene and insoluble derivatives thereof, such as methyl-naphthalene, dinaphthyl-methane (obtainable from naphthalene and formaldehyde) and the like. The insoluble hydrocarbon takes part in the reaction and the condensation product formed contains therefore less sulfonic acid groups than naphthalene nuclei. Nevertheless the product is soluble in water, unless the quantity of the insoluble naphthalene hydrocarbon was too high, and in order to obtain directly products which are wholly or chiefly soluble in water, we avoid the addition of too high a quantity of the insoluble naphthalene hydrocarbons which quantity can easily be ascertained by a preliminary experiment. As an instance we mention that two and even more molecular proportions of naphthalene to one molecular proportion of naphthalene sulfonic acid, if condensed with one molecular proportion of formaldehyde, still yield water-soluble condensation products. The condensation is preferably carried out in the presence of non-sulfonating condensing agents, such as sulfuric acid of such concentration as to have no material sulfonating action. In case the condensation product should possess an insufficient solubility in water, it can subsequently be transformed into a sufficiently soluble product by treating it, in the usual manner, with a sulfonating agent. The new products have the property of precipitating glue in acid solution and can be used for tanning skins. They further can serve for dissolving the difficultly soluble constituents of natural tanning extracts.

In order to further illustrate the invention, we give the following examples, but the invention is not confined to the examples. The parts are by weight.

Example I.

Introduce, into 100 parts of sulfuric acid of 50%, 33 parts of beta-naphthalene-sulfonic acid, 5 parts of naphthalene and 10.5 parts of formaldehyde solution of 30%. Heat the suspension, while carefully stirring, at 95° C. during about 6 hours. The smell of formaldehyde has then disappeared and a product will be formed, which is soluble in water and contains only traces of oily substances which can be extracted by ether from the solution after having been made alkaline.

Example II.

Introduce, into a mixture of 25 parts of monohydratic sulfuric acid and 35 parts of water, 18.5 parts of crystallized beta-naphthalene sulfonic acid (containing 3 molecular proportions of water), 4.2 parts of beta-methyl-naphthalene and 6 parts of 30% formaldehyde solution. Shake the mixture strongly in a closed vessel for nine to ten hours at about 98 to 100° centigrade. The product is soluble in water with a light dullness.

Example III.

Introduce, into 50 parts of 50% sulfuric acid, 9 parts of naphthalene, 8 parts of beta-naphthalene-sulfonic acid ($C_{10}H_7.SO_3H+3H_2O$) and 5.5 parts of 30% formaldehyde solution. Shake the mixture very strongly in a closed vessel for 6 to 7 hours at about 98 to 100° C. The reaction mass forming a tough ball can be separated from the watery sulfuric acid and is then soluble in water to a dull solution. Its solubility can be increased by introducing it into 50 parts of fuming sulfuric acid containing 23% $SO_3$ and heating at 100 to 110° C. for some time until the product is easily soluble in water. The excess of sulfuric acid can then be removed in the usual way, *e. g.* by means of lime, and the calcium salt formed can be reconverted into the free sulfonic acid.

In an analogous manner the process can be carried out, if the naphthalene is replaced by another insoluble naphthalene hydrocarbon, such as alpha-dinaphthyl-methane (see Grabowski, *Berichte der Deutschen Chemischen Gesellschaft*, vol. 7, page 1605).

We claim:

1. The process of producing water-soluble condensation products which consists in treating with formaldehyde a mixture of a naphthalene sulfonic acid and an insoluble naphthalene hydrocarbon.

2. The process of producing water-soluble condensation products which consists in treating with formaldehyde a mixture of a naphthalene sulfonic acid and naphthalene.

3. The process of producing water-soluble condensation products which comprises treating with formaldehyde, in the presence of sulfuric acid of non-sulfonating strength, a mixture of a naphthalene sulfonic acid and naphthalene.

4. The process of producing water-soluble condensation products which comprises treating with formaldehyde, in the presence of sulfuric acid of non-sulfonating strength, a mixture of beta-naphthalene sulfonic acid and naphthalene.

5. The process of producing water-soluble condensation products which consists in treating with formaldehyde a naphthalene sulfonic acid and an insoluble naphthalene hydrocarbon and then treating the product with a sulfonating agent.

6. As a new article of manufacture the water-soluble condensation product obtainable by condensing with formaldehyde, a mixture of an insoluble naphthalene hydrocarbon and a naphthalene sulfonic acid, which product contains less sulfonic acid groups than naphthalene-nuclei and is capable of precipitating glue in acid solutions.

In testimony whereof we have hereunto set our hands.

OTTO SCHMIDT.
FRITZ GÜNTHER.